(12) United States Patent
Feilders et al.

(10) Patent No.: US 11,385,147 B2
(45) Date of Patent: Jul. 12, 2022

(54) SYSTEM AND METHOD FOR FILTERING SAMPLES FROM VESSELS

(71) Applicant: SEIGNIORY CHEMICAL PRODUCTS LTD., Baie d'Urfe (CA)

(72) Inventors: George Feilders, Beaconsfield (CA); Art Ross, Selkirk (CA); Pieter Roos, Lassalle (CA); Guobin Ma, Dorval (CA)

(73) Assignee: SEIGNIORY CHEMICAL PRODUCTS LTD., Baie d'Urfe (CA)

( * ) Notice: Subject to any disclaimer, the term of this patent is extended or adjusted under 35 U.S.C. 154(b) by 386 days.

(21) Appl. No.: 16/817,768

(22) Filed: Mar. 13, 2020

(65) Prior Publication Data

US 2020/0292426 A1 Sep. 17, 2020

Related U.S. Application Data

(60) Provisional application No. 62/818,837, filed on Mar. 15, 2019.

(51) Int. Cl.
*G01N 1/40* (2006.01)
*B01L 3/00* (2006.01)

(52) U.S. Cl.
CPC ........ *G01N 1/4077* (2013.01); *B01L 3/50255* (2013.01); *B01L 2400/049* (2013.01); *G01N 2001/4088* (2013.01)

(58) Field of Classification Search
CPC ..... B01L 2300/0672; B01L 2300/0829; B01L 2400/049; B01L 3/50255; G01N 1/4077; G01N 2001/4088
See application file for complete search history.

(56) References Cited

U.S. PATENT DOCUMENTS

| 4,493,815 A | 1/1985 | Fernwood et al. |
| 4,797,259 A | 1/1989 | Matkovich et al. |

(Continued)

FOREIGN PATENT DOCUMENTS

| DE | 3618884 A1 | 2/1985 |
| DE | 3425762 A1 | 12/1986 |
| GB | 2176601 | 12/1986 |

OTHER PUBLICATIONS

Deena II, "Automated metals digestion and sample preparation", Seal Analytical, www.seal-analytical.com, 4 pages.

*Primary Examiner* — Jennifer Wecker
*Assistant Examiner* — Jonathan Bortoli
(74) *Attorney, Agent, or Firm* — Norton Rose Fulbright Canada LLP; Alexandre Daoust; Reno Lessard

(57) ABSTRACT

A method and filtering system are described. The filtering system comprises a vacuuming plate having a base with a plurality of outlet openings extending therethrough, a plurality of walls extending from the base to define a cavity, and a vacuum port in fluid communication with the cavity; and a filtering unit mounted to the vacuuming plate and enclosing the cavity. The filtering unit comprises a filter plate with a plurality of filter openings extending therethrough and aligned with the outlet openings; a filtering membrane extending across the filter plate and covering the plurality of filter openings; and a piercing plate on the filter plate maintaining the filtering membrane therebetween, the piercing plate having a plurality of vessel piercing members extending away from the filtering membrane, the vessel piercing members having conduits extending through the piercing plate, the conduits aligned with the filter openings to allow fluid flow therebetween.

20 Claims, 8 Drawing Sheets

(56) References Cited

U.S. PATENT DOCUMENTS

| | | |
|---|---|---|
| 7,413,910 B2 | 8/2008 | Kearney et al. |
| 2006/0191893 A1* | 8/2006 | Weinfield ............... B01D 61/18 |
| | | 219/428 |
| 2011/0104026 A1 | 5/2011 | Yoon et al. |
| 2012/0070823 A1* | 3/2012 | Rothmann ............. C12M 47/06 |
| | | 435/6.1 |

* cited by examiner

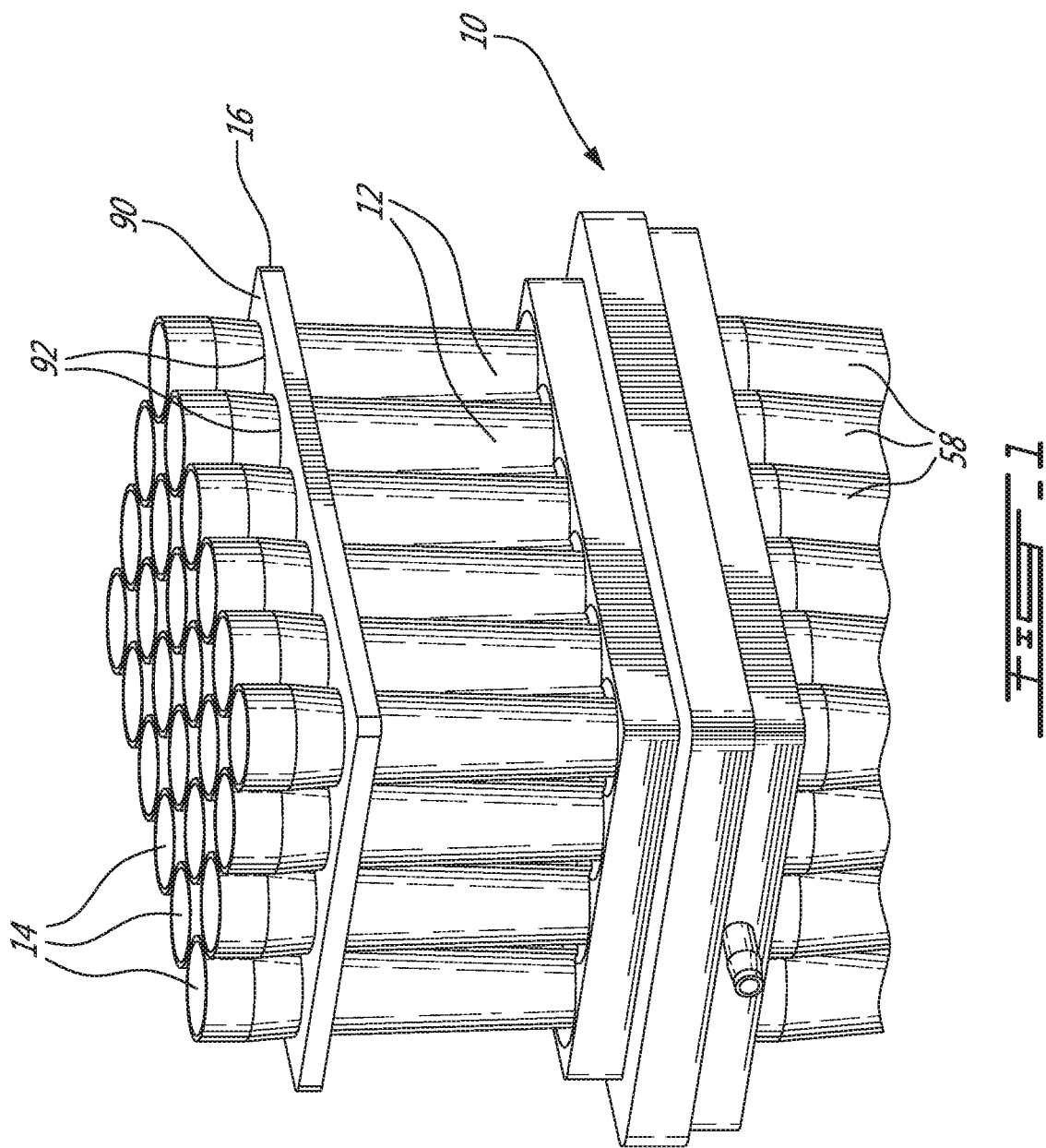

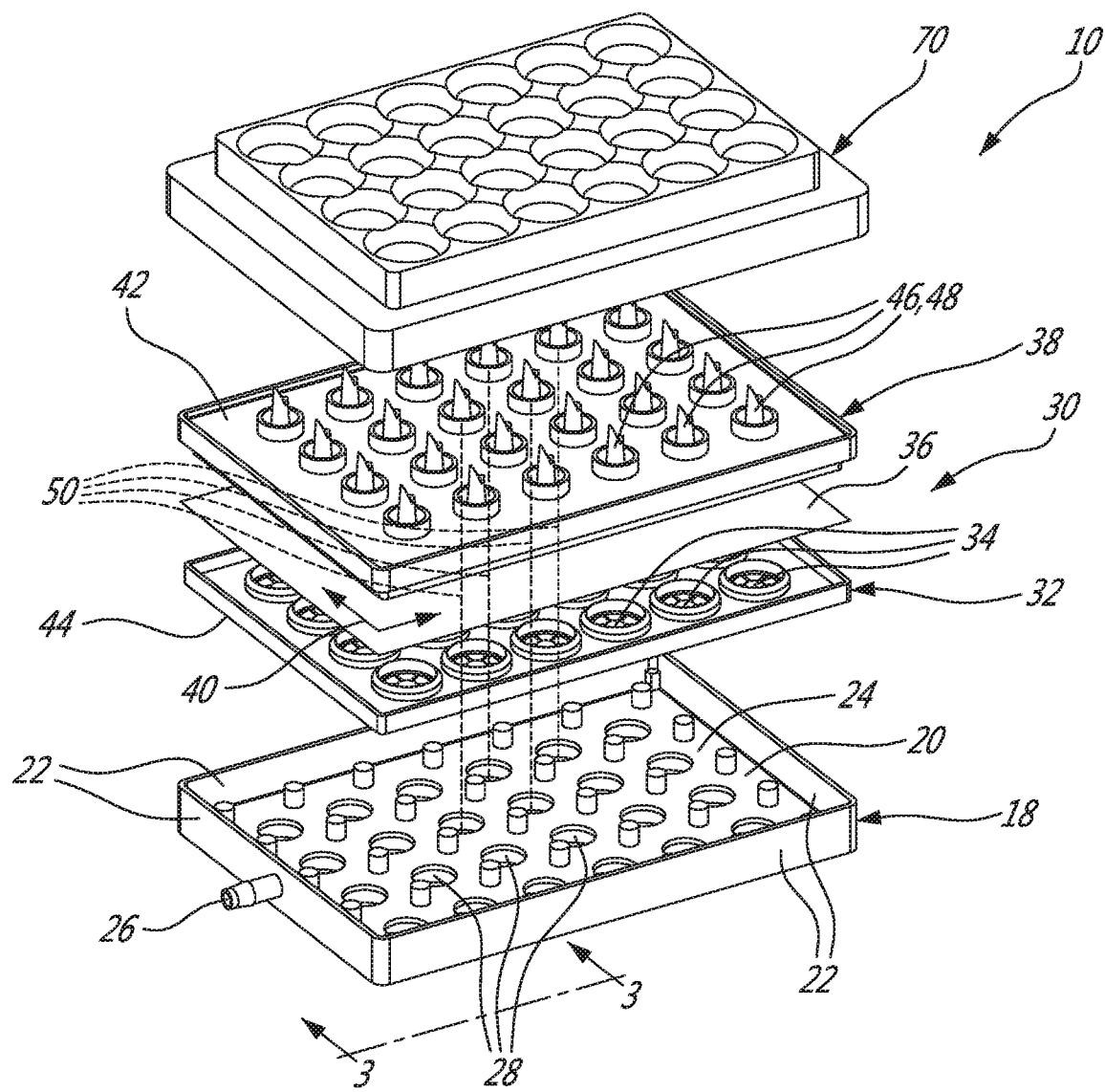

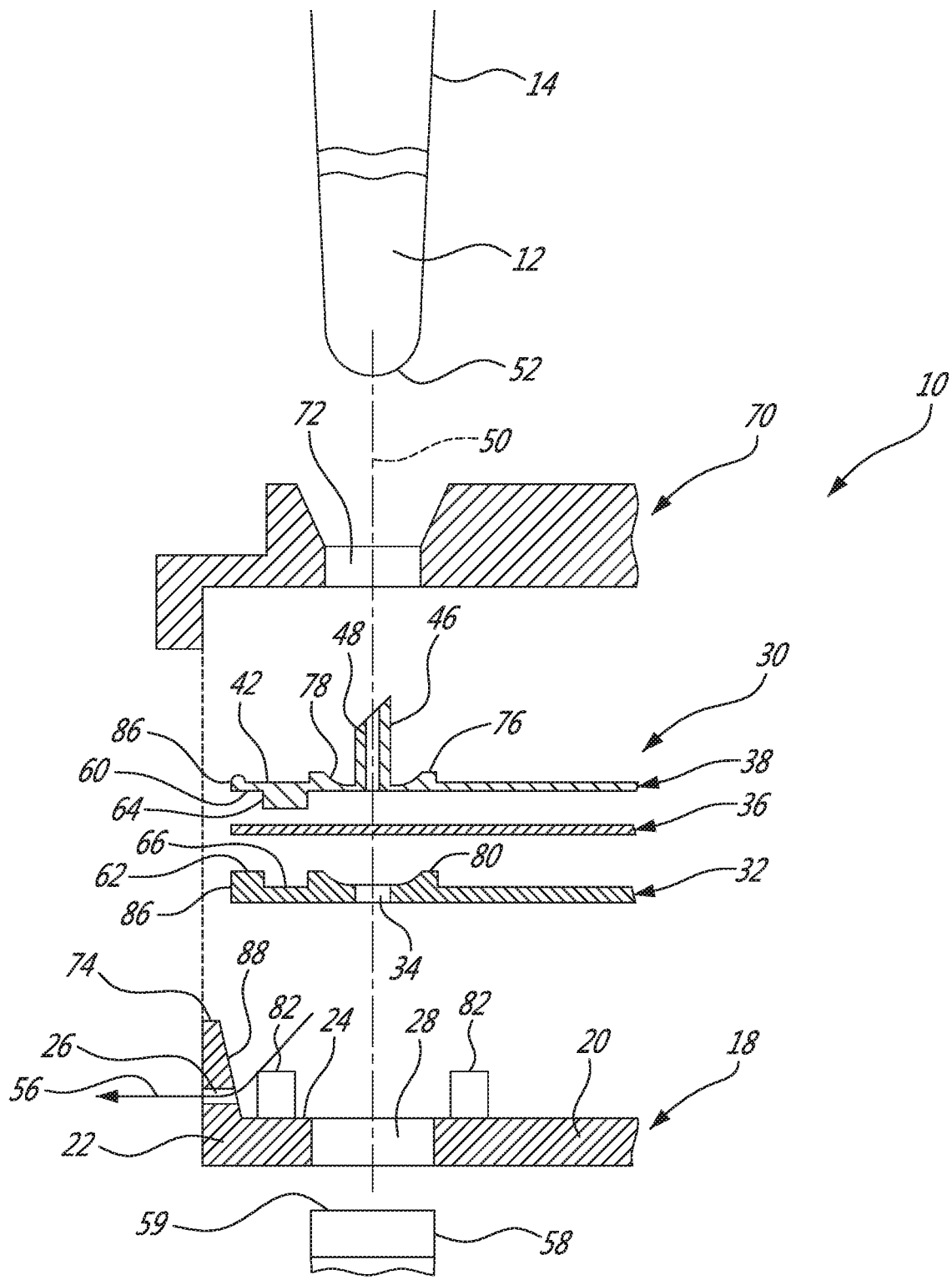

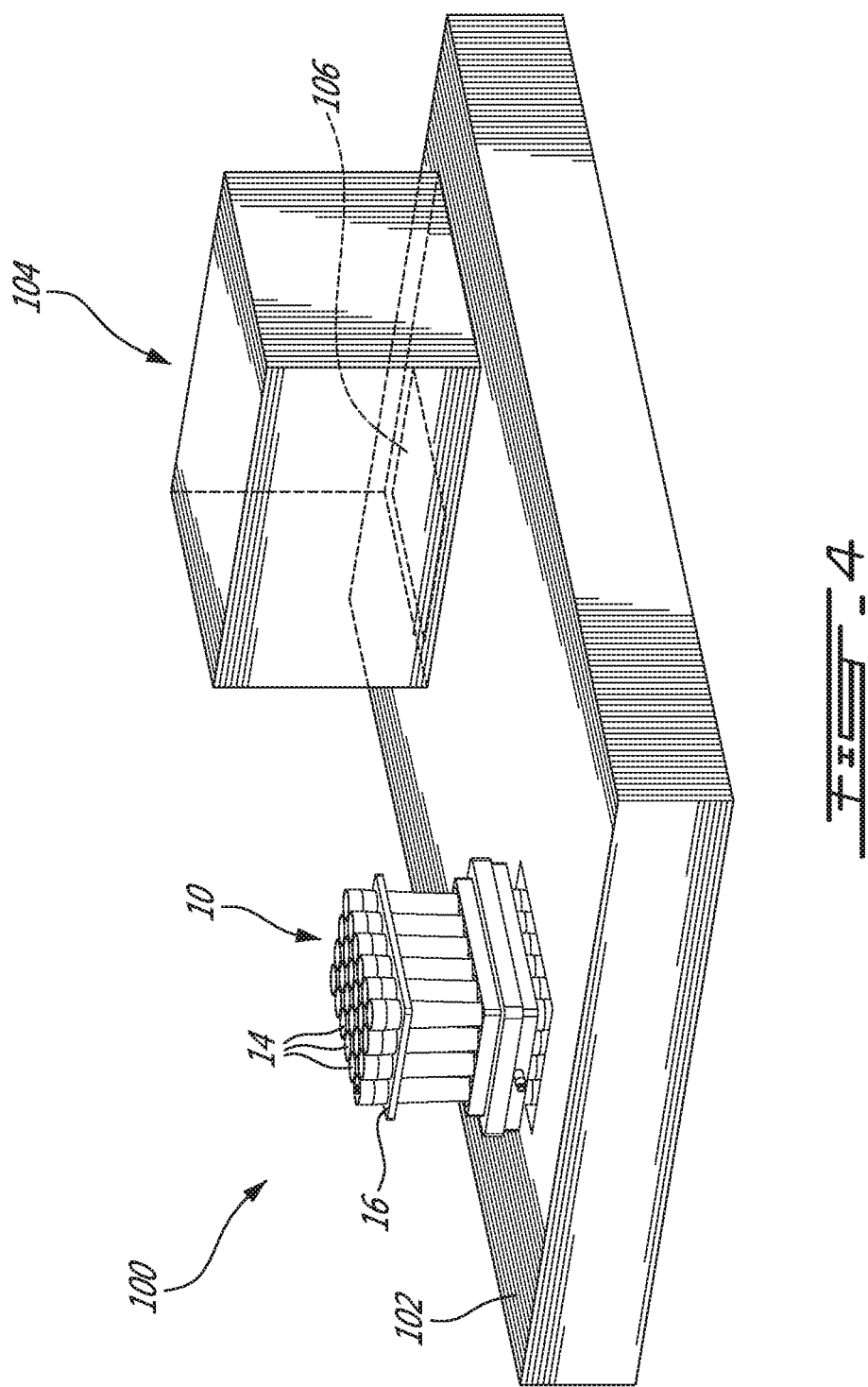

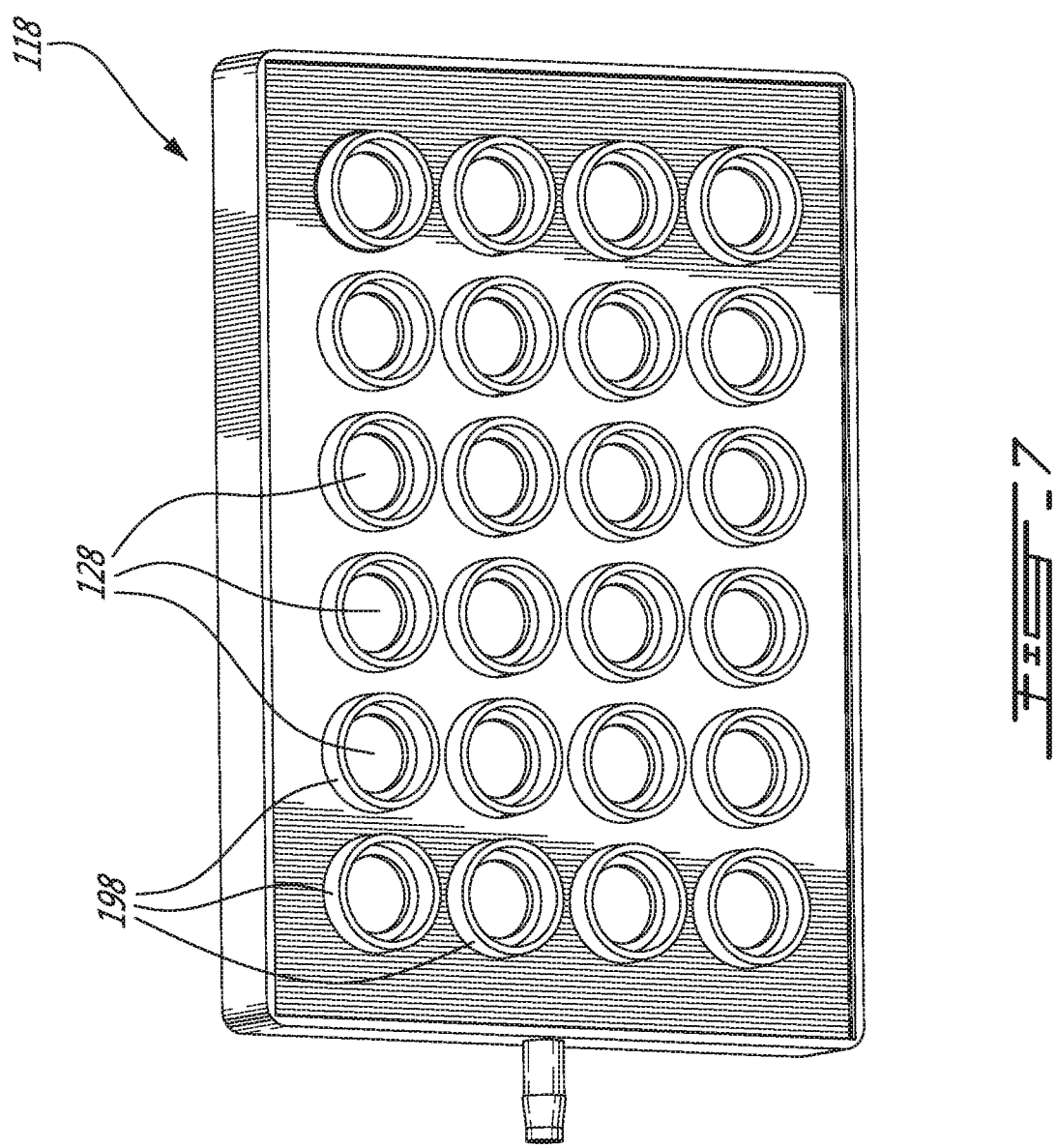

SYSTEM AND METHOD FOR FILTERING SAMPLES FROM VESSELS

CROSS-REFERENCE TO RELATED APPLICATIONS

The present application claims the benefit of U.S. Provisional Patent Application No. 62/818,837 filed on Mar. 15, 2019, the contents of which are hereby incorporated by reference.

TECHNICAL FIELD

The present disclosure relates generally to filtering of samples, and more particularly to filtering of samples contained in vessels, for example after their digestion on digestion systems.

BACKGROUND OF THE ART

Digestion systems are used in laboratories to perform thermal decomposition of samples. The samples are generally provided in open vessels.

To facilitate manipulations into and out of the digestion system, the vessels are generally held together by a vessel holder which is more easily handled than individual vessels. When digestion is completed, the vessels may be removed from the vessel holder so that the samples can be individually filtered using various filtration techniques. When the vessels are individually manipulated by a laboratory staff or robot, there exists a risk of manipulation errors.

Although existing techniques for filtrating such digested vessels have been satisfactory to a certain degree, there remains room for improvement.

SUMMARY

In accordance with a broad aspect, there is provided a filtering system for filtering samples held in a plurality of vessels. The filtering system comprises a vacuuming plate having a base with a plurality of outlet openings extending therethrough, a plurality of walls extending from the base to define a cavity, and a vacuum port in fluid communication with the cavity; and a filtering unit mounted to the vacuuming plate and enclosing the cavity. The filtering unit comprises a filter plate with a plurality of filter openings extending therethrough and aligned with the outlet openings to allow fluid flow therebetween; a filtering membrane extending across the filter plate and covering the plurality of filter openings; and a piercing plate on the filter plate maintaining the filtering membrane therebetween, the piercing plate having a plurality of vessel piercing members extending away from the filtering membrane, the vessel piercing members having conduits extending through the piercing plate, the conduits aligned with the filter openings to allow fluid flow therebetween.

In accordance with another broad aspect, there is provided a method for filtering samples contained in a plurality of originating vessels. The method comprises piercing bottom surfaces of the plurality of originating vessels by aligning the bottom surfaces with a plurality of vessel piercing members of a filtering system; drawing the samples from the plurality of originating vessels through the pierced bottom surfaces of the originating vessels, through conduits of the piercing members, through a filtering membrane and through filter openings of the filtering system, the filtering membrane extending across the filter openings, by applying a vacuum to the filtering system; and receiving the sample as filtered in a plurality of outlet openings aligned with the filter openings of the filtering system.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 1 is an oblique view of an example of a filtering system, shown with vessels received thereon;

FIG. 2 is an exploded view of the filtering system of FIG. 1;

FIG. 3 is an exploded view of a portion of the filtering system of FIG. 1 taken along section 3-3 of FIG. 2, shown with a vessel having a sample therein;

FIG. 4 is perspective view of an example of a digestion system incorporating the filtering system of FIG. 1;

FIG. 7 is a bottom view of an example of a vacuuming plate;

FIG. 9 is a perspective view of an example of a vessel of the array of FIG. 8.

It will be noted that throughout the appended drawings, like features are identified by like reference numerals.

DETAILED DESCRIPTION

Figure 5A:
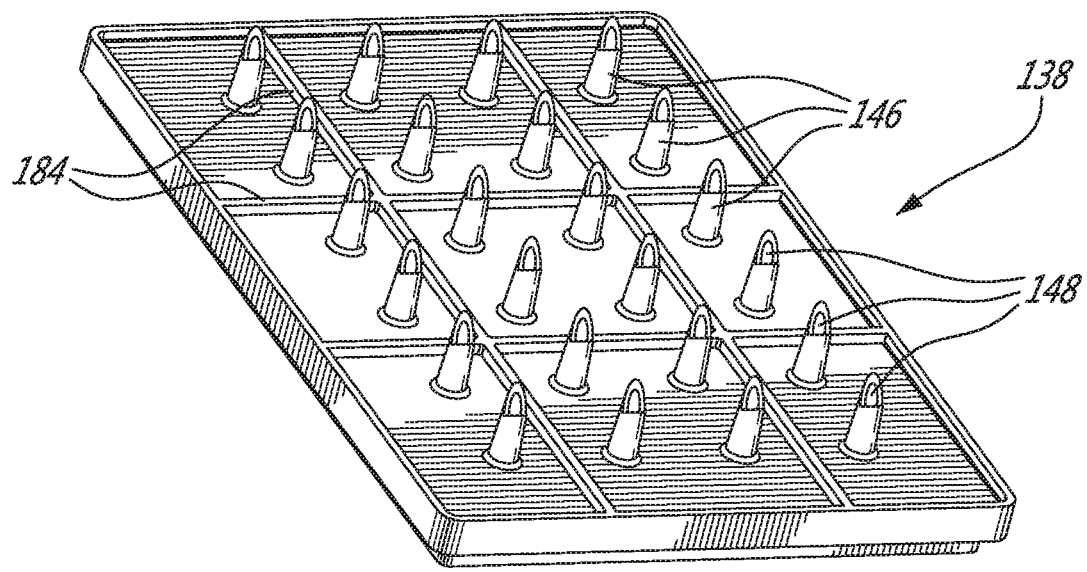
FIG. 5A is a perspective view of an example of a piercing plate.

There are described herein systems and methods for filtering a plurality of vessels, for example after their digestion on or inside a digestion system. In an example embodiment, the digestion system is a thermal block digestion system. The filtering systems and methods described herein may be used for any set of vessels having samples therein requiring filtration, such as but not limited to samples digested by a microwave digestion system.

FIG. 1 shows an example of a filtering system 10 for filtering samples 12 contained in vessels 14, in accordance with some embodiments. In this specific example, the vessels 14 are held together via a vessel holder 16, which can ease manipulation of the vessels 14. Although the illustrated embodiment incorporates the vessel holder 16, it is intended that the vessel holder 16 is only optional.

FIG. 2 shows an exploded view of the filtering system 10. As depicted, the filtering system 10 has a vacuuming plate 18 with a base 20, walls 22 extending from the base 20 to define a cavity 24, and a vacuum port 26 in fluid communication with the cavity 24. In this embodiment, the vacuum port 26 is used to pull air from the cavity 24. The base 20 has outlet openings 28 which are spaced-apart from one another in this example.

As illustrated, the filtering system 10 has a filtering unit 30 which is removably mounted to the vacuuming plate 18 and which encloses the cavity 24 when so-mounted. The filtering unit 30 has a filter plate 32 with filter openings 34 aligned with the outlet openings 28 of the vacuuming plate 18 to allow fluid flow therebetween.

The filtering unit 30 has a filtering membrane 36 which covers the filter openings 34 of the filter plate 32. The filtering membrane 36 is adapted to prevent a solid portion of the sample from passing through the filtering membrane 36 while allowing a fluid portion of the sample to flow through the filtering membrane 36. The fluid portion of the sample is also referred to as the "filtered sample" in this disclosure.

As depicted, the filtering unit 30 also has a piercing plate 38 which is removably received on the filter plate 32 and which sandwiches the filtering membrane 36 between the filter and piercing plates 32 and 38. As such, the filtering membrane 36 lies in a plane 40 extending between top and bottom surfaces 42 and 44 of the filtering unit 30 in this example. As shown, the piercing plate 38 has vessel piercing members 46 which extend away from the filtering membrane 36. Each vessel piercing member 46 has a respective conduit 48 extending through the piercing plate 38 and aligned with a corresponding one of the filter openings 34 of the filter plate 32 to allow fluid flow therebetween.

Accordingly, when the filtering unit 30 is mounted to the vacuuming plate 18, the conduits 48 of the vessel piercing members 46 of the piercing plate 38, the filter openings 34 of the filter plate 32 and the outlet openings 28 of the vacuuming plate 18 are aligned with one another. Such an alignment defines fluid flow paths 50 extending through the conduits 48, through corresponding portions of the same filtering membrane 36, through the filter openings 34 and through the outlet openings 28 of the vacuuming plate 18.

Referring now to FIG. 3, a bottom surface 52 of an originating vessel 14 is pierced by aligning the bottom surface 52 with a corresponding vessel piercing member 46 of the piercing plate 38 of the filtering unit 30, generally located on the top surface 42 of the filtering unit 30.

Then, the sample 12 can be drawn from the originating vessel 14 through the pierced bottom surface 52 of the originating vessel 14 and along the corresponding fluid path 50, by applying a vacuum 56 below the filtering membrane 36. In this embodiment, the vacuum 56 is applied to the vacuum port 26 of the filtering system 30.

Upon vacuum, the sample 12 as filtered is received in a corresponding recipient vessel 58 (also shown in FIG. 1) located below the vacuuming plate 18 and aligned with the outlet openings 28 to allow fluid flow therethrough, after which the filtered sample 12 can be collected for subsequent uses.

In some embodiments, the outlet openings 28 of the vacuuming plate 18 are sized and shaped to sealingly receive top surfaces 59 of corresponding ones of the recipient vessels 58, inside which the filtered sample 12 can be received, so as to allow an individual filtered sample 12 to be handled individually upon completion of the filtering process.

Although steps for filtering the sample 12 of a single originating vessel 14 have been described above, it is understood that these steps can be applied simultaneously for all of the vessels 14 received on the filtering unit 30, thereby resulting in filtering the samples 12 of the vessels 14 at once in some embodiments. In some embodiments, only a subset of the vessels 14 contain samples and are filtered using the filtering system 10. The samples 12 in the vessels 14 can be identical copies of one another in some embodiments, or be different from one another in some other embodiments.

As illustrated, the vacuum port 26 extends from one of the walls 22 of the vacuuming plate 18. However, in some other embodiments, the vacuum port 26 can extend from the base 20. The vacuuming plate 18 can have more than one vacuum port in alternate embodiments.

As shown, in this example, the piercing and filter plates 38 and 32 are matingly engaged to one another, thereby allowing the filtering unit 30 to be easily manipulable when so-assembled. The piercing plate 38 can have mating features at an undersurface 60 of the piercing plate 38 whereas the filter plate 32 can have mating features at a top surface 62 of the filter plate 32.

In this specific example, the piercing plate 38 has male mating features 64 which protrude from the undersurface 60 of the piercing plate 38 towards the filter plate 32, and the filter plate 32 has female mating features 66 which are recessed from the top surface 62 of the filter plate 32. The mating features 64 and 66 of the piercing and filter plates 32 and 38 are made to correspond to one another in a manner that, when the filtering membrane 36 is sandwiched therebetween, the piercing and filter plates 32 and 38 are engaged to one another. Accordingly, a spacing may be left out between the mating features 64 and 66. A tight mating between the piercing and filter plates 32 and 38 can avoid cross contamination of samples 12 in different vessels 14.

After the samples in the digested vessels 14 have been filtered, the piercing and filter plates 38 and 32 can be unmounted from one another, thereby allowing the filtering membrane 36 used during filtration to be replaced with an unused filtering membrane. In some other embodiments, the filtering system 10, or some parts thereof, can be provided in the form of a one-time use disposable component.

In some embodiments, the filtering system 10 has a vessel alignment plate 70 which is removably mounted to the vacuuming plate 18. As shown, the vessel alignment plate 70 has vessel openings 72 aligned with the vessel piercing members 46 to allow fluid communication therebetween.

The vessel alignment plate 70 is matingly engaged with the vacuuming plate 18 in this example. However, in other embodiments, the vessel alignment plate 70 can be abutted against a top edge 74 of the walls 22 of the vacuuming plate 18 or on the top surface 42 of the filtering unit 30. Other embodiments for engaging the vessel alignment plate 70 with the vacuuming plate 18 or the filtering unit 30 are also considered.

In the embodiment illustrated in FIG. 3, the vessel alignment plate 70 is sealingly mounted to the vacuuming plate 18. However, in alternate embodiments, such sealing can also be omitted.

As shown, the piercing plate 38 may have annular members 76 surrounding the vessel piercing members 46. When the vessel alignment plate 70 is received on the piercing plate 38, the vessel openings 72 of the vessel alignment plate 70 receive the annular members 76 of the piercing plate 38, which can help in aligning the vessel alignment plate 70 with respect to the piercing plate 38.

In some embodiments, a top surface 78 of the annular members 76 of the piercing plate 38 can be sized and shaped to receive the bottom surface 52 of the vessel 14. For instance, the top surface 78 of the annular members 76 can have a concave shape.

The filter plate 32 may also have annular members 80 which surround the filter openings 34 and which extend towards the piercing plate 38 to abut the filtering membrane 36 against the piercing plate 38. As such, the filtering membrane 36 can be sandwiched and further clamped between the piercing and filter plates 38 and 32.

In some embodiments and as shown, the vacuuming plate 18 has spacers 82 extending from the base 20 towards the filtering unit 30 for spacing and/or supporting the filter plate 32 of the filtering unit 30 from the base 20 of the vacuuming plate 18. Accordingly, the filtering unit 30 can be mounted to the vacuuming plate 18 by depositing the filtering unit 30 on the spacers 82 of the vacuuming plate 18. The height of the spacers 82 can vary from one embodiment to another, depending on whether a smaller or larger cavity is desired.

In embodiments where the vessel alignment plate 70 is not sealingly mounted to the vacuuming plate 18, the filtering unit 30 can be sealingly mounted to the vacuuming plate 18 instead. More specifically, the filtering unit 30 can have an external perimeter seal 86 which is abuttable to an interior surface 88 of the walls 22 of the vacuuming plate 18. The external perimeter seal 86 can be made integral to either one or both of the piercing and filter plates 38 and 32. In addition or instead, the seal can be made integral to the interior surface 88 of the walls 22. Sealing may also be performed using an O-ring between the surface formed by the external perimeter seal 86 and the interior surface 88 of the piercing and filter plates 38 and 32.

In some embodiments, the interior surface 88 of the walls 22 is provided with a sloped surface, tapering from the base 20 to the top edge 74 of the walls 22. In this way, the filtering unit 30 can be abutted against the sloped surface of the walls 22, and thereby seal the cavity 24 extending between the filtering unit 30 and the vacuuming plate 18. In these embodiments, the height of the spacers 82 can be made to correspond to the expected height at which the bottom surface 52 of the filtering unit 30 is expected to reach when sealingly mounted to the vacuuming plate 18.

As illustrated in this embodiment, the vessel openings 72 of the vessel alignment plate 70, the vessel piercing members 46 of the piercing plate 38, the filter openings 34 of the filter plate 32 and the outlet openings 28 of the vacuuming plate 18 are spaced-apart from one another in a rectangular array of M by N, where M and N are positive integers greater than unity. In some other embodiments, however, the array can have any other appropriate shape.

For retrofitting purposes, the rectangular array of the filtering system 10 can be made to correspond to a rectangular array generally associated to vessel holders such as the one illustrated at 16 in FIG. 1.

For instance, in this example, the vessel holder 16 is provided in the form of a holding plate 90 having vessel apertures 92 extending across the holding plate 90 and inside which the vessels 14 can be snugly received. In this example, the vessel apertures 92 are spaced-apart in the rectangular array of M by N which also corresponds to the rectangular array of the filtering system 10.

In some embodiments, the vessel alignment, piercing, filter and vacuuming plates 70, 38, 32 and 18 are sized and shaped to fit with one another in a compact and modular manner to provide a reduced footprint to the filtering system 10. The vessel alignment, piercing, filter and vacuuming plates 70, 38, 32 and 18 can be made of material which is compatible with chemicals while resistant to high temperatures generally experienced in digestion and filtration processes. For instance, in this embodiment, the vessel alignment, piercing, filter and vacuuming plates 70, 38, 32 and 18 are acid resistant and resist to up to 200° C.

The filtering membrane 36 is sized and shaped to correspond to a size and shape of both the piercing and filter plates 38 and 32, thereby reducing the need of individual filters for each of the fluid flow paths 50.

The filtering membrane 36 can have any suitable filtering material, such as polypropylene, polyethylene, glass fiber, frit, and the like. The filtering membrane 36 can have pores with a pore size ranging between 1 nm and 1 μm, or other suitable sizes. It is intended that a plurality of filtering membranes 36 can be stacked above one another, and sandwiched between the piercing and filter plates 38 and 32 in alternate embodiments.

The above description is meant to be exemplary only, and one skilled in the art will recognize that changes may be made to the embodiments described without departing from the scope of the embodiments disclosed. Still other modifications which fall within the scope of the present embodiments will be apparent to those skilled in the art, in light of a review of this disclosure.

For instance, the filtering system 10 can be provided with one or more conduit sealing elements meant to seal conduits of vessel piercing members 46 which do not receive vessels 14. In this way, the vacuum created in the cavity 24 via the vacuum port 26 can be maintained by preventing fluid from being vacuumed within the cavity 24 via the conduits 48 of unused ones of the vessel piercing members.

It is noted that the vessel piercing members 46 may be sharpened enough to pierce the bottom surface 52 of the digested vessel 14 with relative ease. However, the vessel piercing members 46 are generally provided with sufficient sturdiness to prevent the vessel piercing members 46 from breakage during normal use.

Although the illustrated embodiment shows that each vessel 14 is received and pierced by a single vessel piercing member 46, other embodiments of the filtering system can be sized and shaped so that a single vessel be received on and pierced by more than one of the vessel piercing members of the piercing plate.

The illustrated embodiment shows that the top surfaces 59 of the recipient vessels 58 are sealingly received in corresponding ones of the outlet openings 28 from below the vacuuming plate 18. However, in some other embodiments, the recipient vessels can be sized and shaped to be sealingly received in the outlet openings within the vacuuming plate. In these embodiments, the recipient vessels lie within the cavity enclosed by the filter and vacuuming plates. Further, the outlet openings need not be through-openings in such embodiments, and the engagement between the recipient vessels 58 and the outlet openings 29 does not need to be a sealing engagement.

FIG. 4 shows an example of a digestion system incorporating the filtering system 10 described with reference to FIGS. 2 and 3. As depicted, in this specific embodiment, the digestion system has a frame 102, a digestion station 104 made integral to the frame 102 and the filtering system 10. The filtering system 10 can be removably mounted to the frame 102. In this example, the digestion station 104 has a block heater 106 receiving the vessels 14 held by the vessel holder 16 and heating the vessels 14 for digestion purposes. Once the samples in the vessels 14 are digested, the vessels 14 can be received on the filtering system 10 for their filtration, in accordance with the embodiments described above.

The filtering system 10 can be provided in arrays of 12, 24, 48 or any other suitable number of vessels 14. In the illustrated embodiment, the vessels 14 have a volume of about 12 mL, however the volume can differ from one embodiment to another. With 12 mL vessels, the samples 12 can have a volume of about 2 mL in some embodiments. The plates of the filtering system 10 are consumables. Accordingly, the filtering unit 10 may be compatible with injection processes in order to produce the plates in an easy and affordable manner. Examples of injection moulded plates are described in the following paragraphs.

Figure 5B:
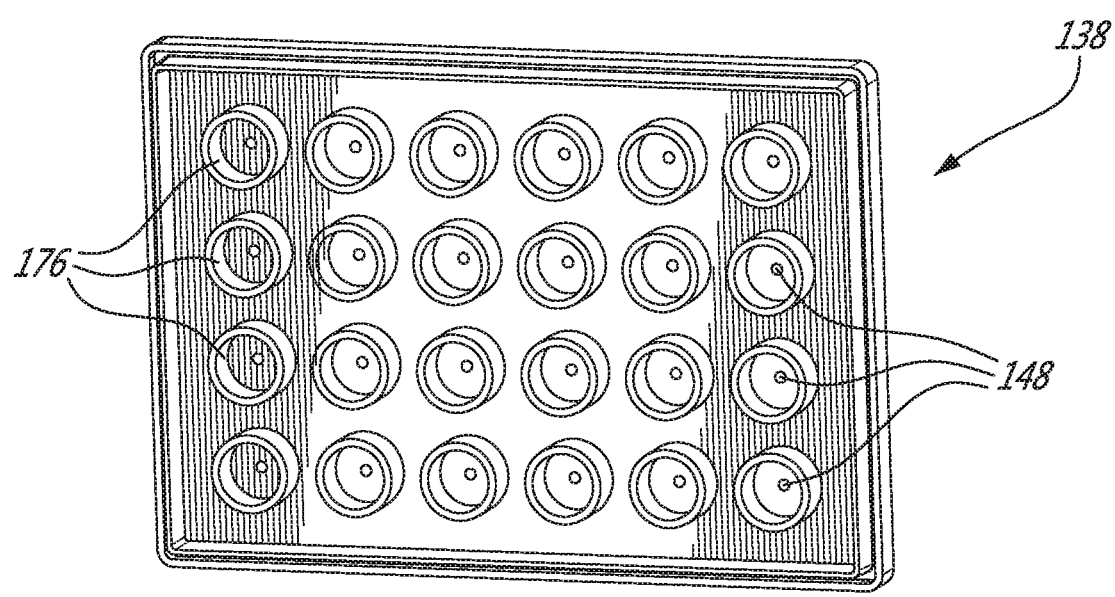
FIG. 5B is a bottom view of the piercing plate of FIG. 5A.

FIGS. 5A and 5B show an example of a piercing plate 138. As depicted, the piercing plate 138 has vessel piercing members 146 extending away from the piercing plate 138, and conduits 148 extending through the piercing plate 138. In this example, the piercing plate 138 has ribs 184 extending across the piercing plate 138 to provide structure to the piercing plate 138. Moreover, the illustrated piercing plate 138 has annular members 176 surrounding the conduits 148 on a bottom surface of the piercing plate, as best shown in FIG. 5B. In this specific embodiment, the piercing plate 138 omits the annular members 76 surrounding the vessel piercing members 46 as described with reference to the embodiment of FIG. 3.

Figure 6A:
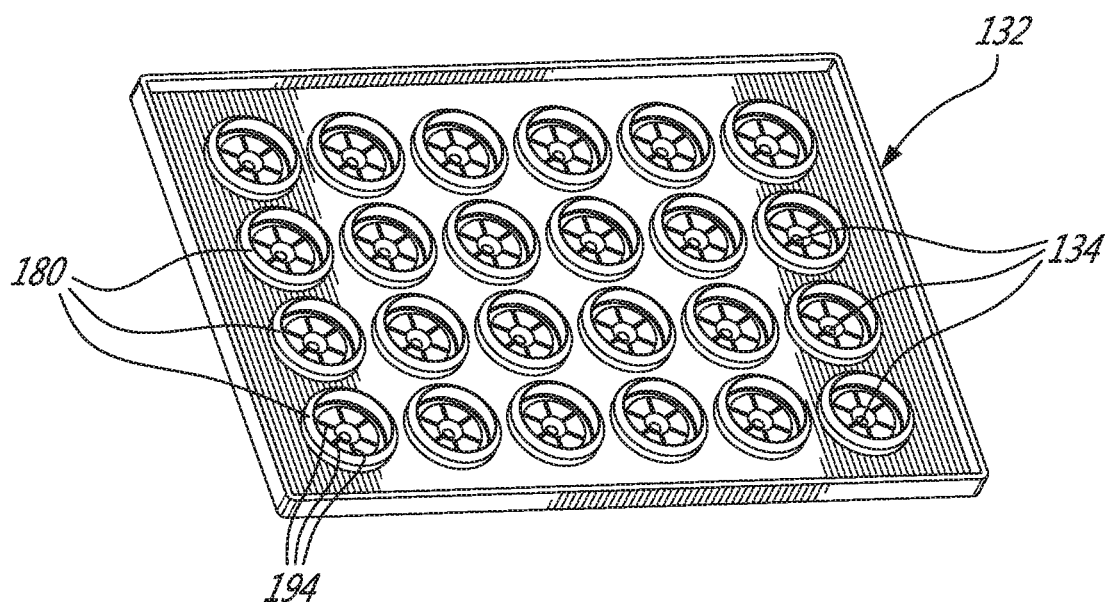
FIG. 6A is a perspective view of an example of a filter plate.
Figure 6B:
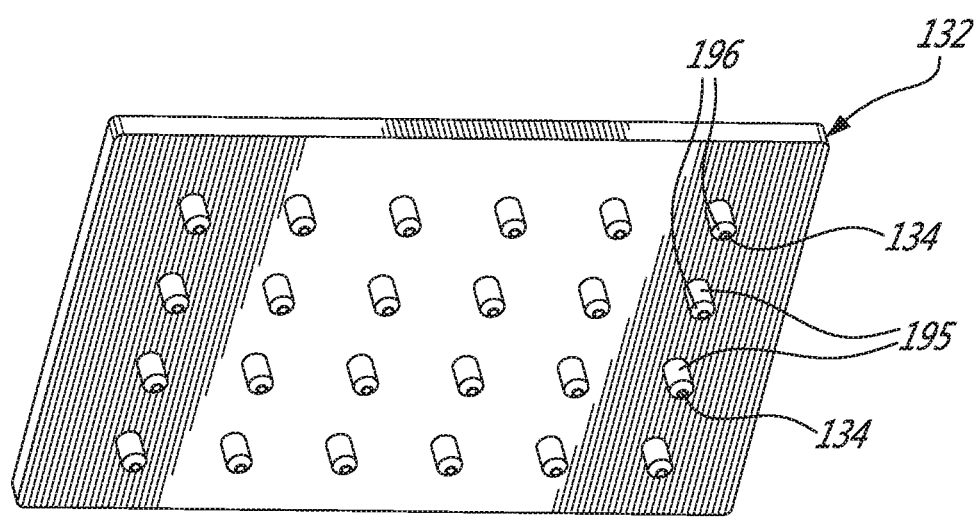
FIG. 6B is a bottom view of the filter plate of FIG. 6A.

FIGS. 6A and 6B show an example of a filter plate 132. In this specific embodiment, the filter plate 132 has annular members 180 surrounding the filter openings 134. As best shown in FIG. 6A, the filter plate 132 has radially extending grooves 194, extending inwardly from each annular member 180 towards the corresponding filter opening 134, to guide fluid towards the opening 134 during filtration. The filter plate 132 has conduits 195, which may be cylindrical, protruding away from the bottom surface of the filter plate 132 and surrounding each of the filter openings 134, as best shown in FIG. 6B. In some embodiments, the cylindrical conduits 195 end in tapering nozzles 196, to help the fluid drip where desired in this embodiment.

FIG. 7A shows an example of a vacuuming plate 118. In this embodiment, the vacuuming plate 118 has receiving members 198 surrounding the outlet openings 128. The receiving members 198 are sized and shaped to sealingly receive top surfaces of corresponding ones of the recipient vessels during use.

Figure 8:
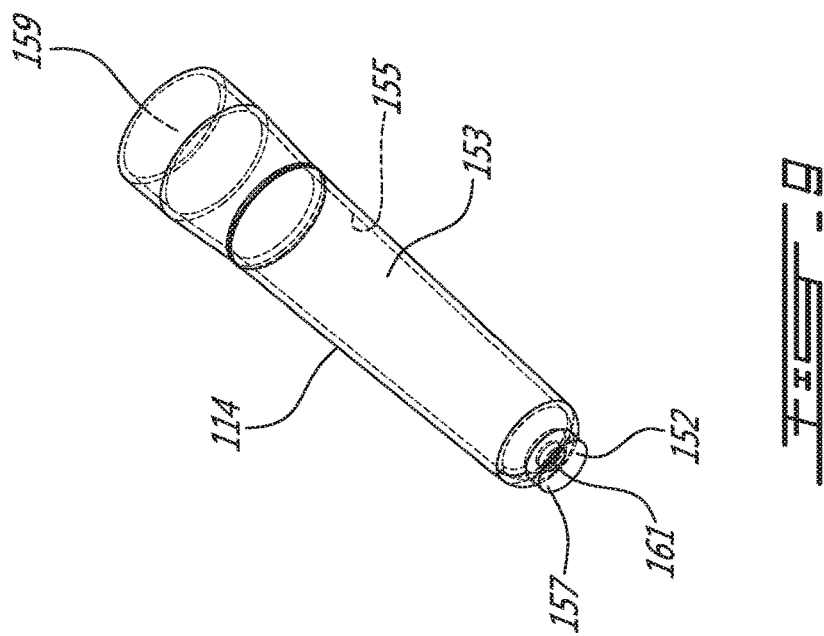
FIG. 8 is a perspective view of an example of an array of vessels.
Figure 8:
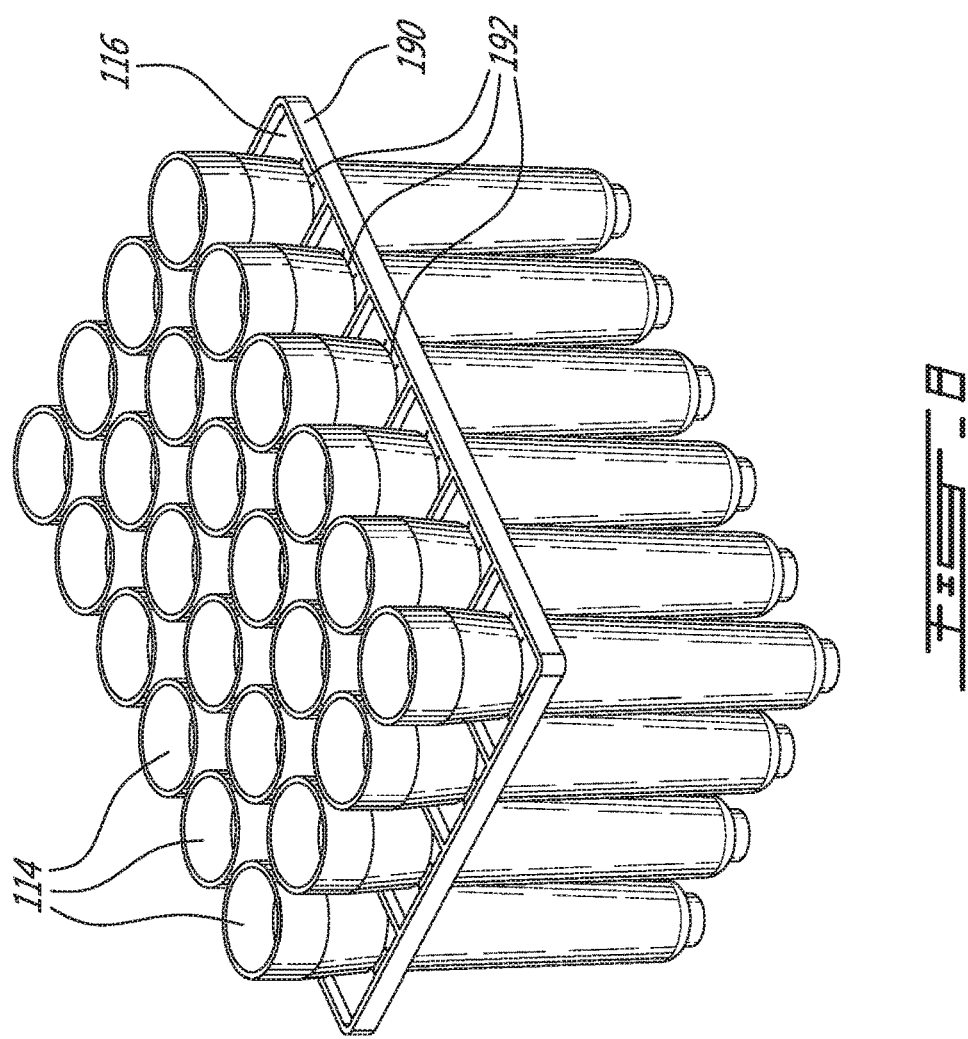

FIG. 8 shows an array of vessels 114 held together by a vessel holder 116. In this example, the vessel holder 116 is provided in the form of a holding plate 190 having vessel apertures 192 extending across the holding plate 190 and inside which the vessels 114 can be snugly received. In this example, the vessel apertures 192 are spaced-apart in a rectangular array of 6 by 4 which also corresponds to the rectangular array of the filtering system 10.

FIG. 9 shows one of the vessel 114, in accordance with some embodiments. As depicted, the vessel 114 has a pierceable base 152, one or more walls 153 extending from the pierceable base 152 to an open end 159. In some embodiments, the walls 153 have a tapered shape 155 so as to be tightly received in the vessel apertures 192 of the vessel holder 116. In some embodiments, the pierceable base 152 has an annular element 157 surrounding a pierceable membrane 161. In some embodiments, the pierceable membrane 161 can sized and shaped in a given material so as to be pierceable upon forcing the vessel 114 onto one of the vessel piercing members 46 of the filtering system 10. In some embodiments, the pierceable membrane 161 may be formed of the same material as a material of the remainder of the vessel 114. In these embodiments, the thickness of the pierceable membrane 161 may be thinner than a thickness of the walls 156, for instance.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. For instance, the filtering system may be used for filtering samples which have not been digested. The scope of the following claims should not be limited by the embodiments set forth in the examples, but should be given the broadest reasonable interpretation consistent with the description as a whole.

The invention claimed is:

1. A filtering system for filtering samples held in a plurality of vessels, the filtering system comprising:
a vacuuming plate having a base with a plurality of outlet openings extending therethrough, a plurality of walls extending from the base to define a cavity, and a vacuum port in fluid communication with the cavity; and
a filtering unit mounted to the vacuuming plate and enclosing the cavity, the filtering unit comprising:
a filter plate with a plurality of filter openings extending therethrough and aligned with the outlet openings to allow fluid flow therebetween;
a filtering membrane extending across the filter plate and covering the plurality of filter openings; and
a piercing plate on the filter plate maintaining the filtering membrane therebetween, the piercing plate having a plurality of vessel piercing members extending away from the filtering membrane, the vessel piercing members having conduits extending through the piercing plate, the conduits aligned with the filter openings to allow fluid flow therebetween.

2. The filtering system of claim 1, further comprising a vessel alignment plate above the filtering unit, the vessel alignment plate having a plurality of vessel openings extending therethrough and aligned with the vessel piercing members to allow fluid communication therebetween.

3. The filtering system of claim 2, wherein the vessel alignment plate is matingly engaged with the vacuuming plate.

4. The filtering system of claim 1, wherein the piercing plate has a plurality of annular members surrounding the vessel piercing members.

5. The filtering system of claim 1, wherein at least one of the filter plate, the piercing plate, and the vacuuming plate are injection moulded.

6. The filtering system of claim 1, wherein the filter plate and the piercing plate are matingly engaged to one another.

7. The filtering system of claim 1, wherein the filter plate has a plurality of annular members surrounding the filter openings and extending towards the piercing plate.

8. The filtering system of claim 7, wherein the filter plate has grooves extending inwardly from each annular member towards the filter openings.

9. The filtering system of claim 1, wherein the filtering plate has conduits extending away from a bottom surface thereof.

10. The filtering system of claim 9, wherein the conduits end in tapering nozzles.

11. The filtering system of claim 1, wherein the vacuuming plate has a plurality of spacers extending from the base towards the filtering unit.

12. The filtering system of claim 1, wherein the vacuum port extends outwardly from one of the walls of the vacuuming plate.

13. The filtering system of claim 1, wherein the piercing plate has ribs extending across a top surface thereof.

14. The filtering system of claim 1, wherein the vacuum plate has receiving members surrounding the outlet openings on a bottom surface thereof.

15. The filtering system of claim 1, wherein the piercing plate has annular members surrounding the conduits on a bottom surface thereof.

16. The filtering system of claim 1, wherein the piercing plate, filter plate and vacuuming plate are sized and shaped to fit with one another in a compact and modular manner.

17. A method for filtering samples contained in a plurality of originating vessels, the method comprising:
  piercing bottom surfaces of the plurality of originating vessels by aligning the bottom surfaces with a plurality of vessel piercing members of a filtering system;
  drawing the samples from the plurality of originating vessels through the pierced bottom surfaces of the originating vessels, through conduits of the piercing members, through a filtering membrane and through filter openings of the filtering system, the filtering membrane extending across the filter openings, by applying a vacuum to the filtering system; and
  receiving the sample as filtered in a plurality of outlet openings aligned with the filter openings of the filtering system.

18. The method of claim 17, wherein receiving the sample as filtered comprises receiving the sample as filtered in a plurality of recipient vessels through corresponding ones of the outlet openings.

19. The method of claim 17, further comprising holding the plurality of originating vessels together with a vessel holder to align the bottom surfaces with the plurality of vessel piercing members.

20. The method of claim 17, further comprising receiving the bottom surfaces of the originating vessels in corresponding ones of vessel openings of a receiving plate of the filtering system, the vessel openings aligned with the vessel piercing members.

* * * * *